Nov. 18, 1958 W. WELTER 2,860,766
ROLLER CONVEYOR
Filed May 7, 1956 2 Sheets-Sheet 1
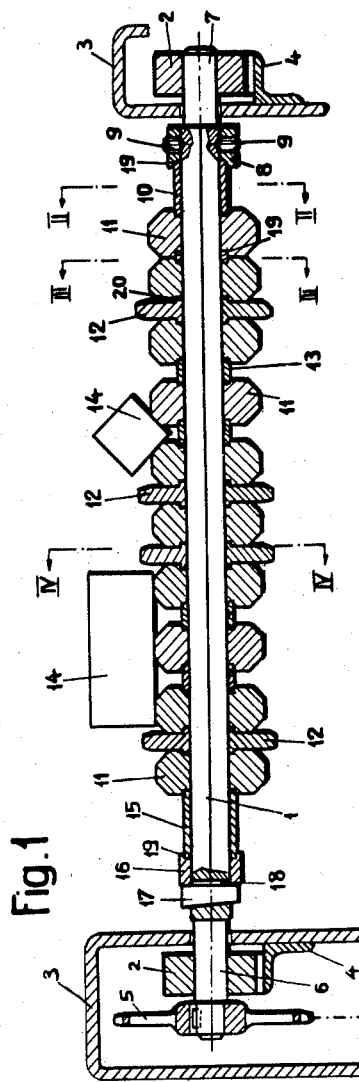
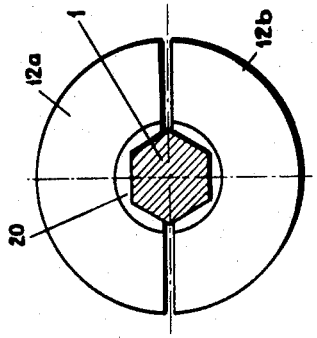
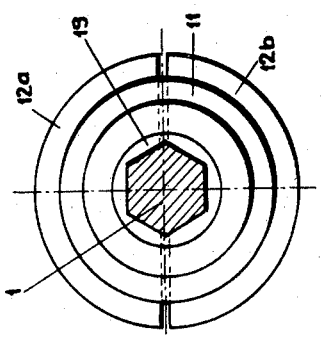
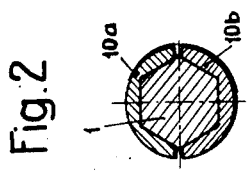
INVENTOR
WILLY WELTER Nov. 18, 1958 W. WELTER 2,860,766
ROLLER CONVEYOR
Filed May 7, 1956 2 Sheets-Sheet 2
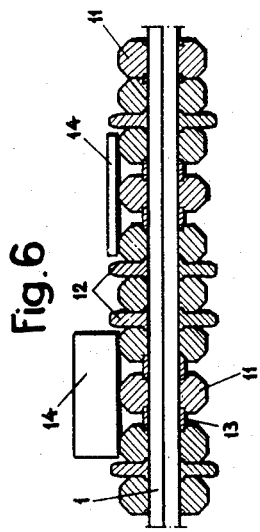
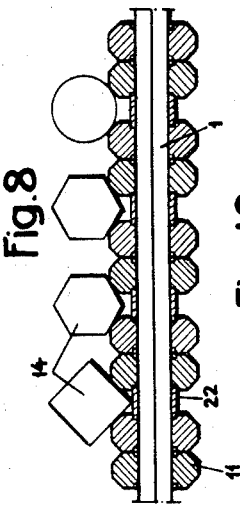
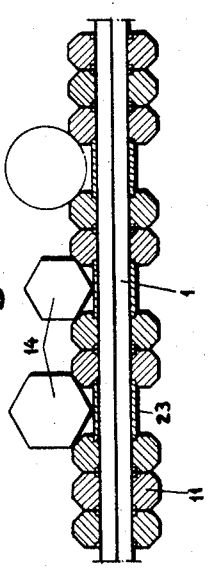
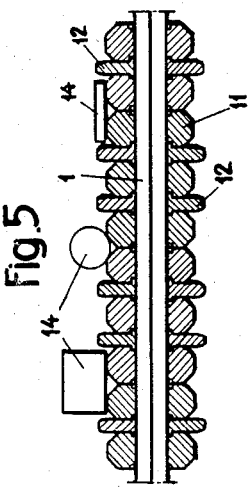
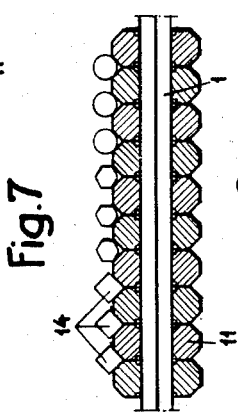
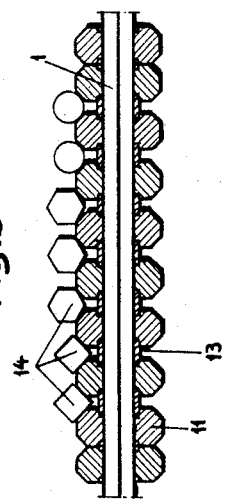
INVENTOR
WILLY WELTER
BY
Ooms, McDougall, Williams and Hersh
ATTORNEYS

United States Patent Office 2,860,766
Patented Nov. 18, 1958

2,860,766

ROLLER CONVEYOR

Willy Welter, Schaffhausen, Switzerland, assignor to Wheelabrator Corporation, Mishawaka, Ind., a corporation of Nebraska Application May 7, 1956, Serial No. 583,274

10 Claims. (Cl. 198—127)

This invention relates to a roller conveyor for longitudinal displacement of work in the form of elongate elements of various cross-sectional dimension and contours, and it relates more particularly to a roller element forming a part thereof and to a roller conveyor of the type described used for the transportation and support of rolled profiles and in combination with a centrifugal blasting machine for conveying the profiles through the path of the blast from the machine for cleaning or for the treatment of the surfaces thereof.

Use has been made, in the past, of roller conveyors in which the rollers are in the form of cylindrical members which are relatively free of any profile in the peripheral surfaces thereof with the result that little, if any, guidance is provided to the elements forwarded on the surfaces thereof. Profile rollers have been employed for purposes of preventing the material being conveyed from deviating sideways but such units have been relatively inflexible in their construction and operation, with the result that only rolled materials of a specific profile can be conveyed properly. Any change in dimension or shape of the work necessitates conversion of the equipment to substitute the rollers of one design for the rollers of another adapted to be used with such material.

It is an object of this invention to produce and to provide a method for producing a roller for use in a roller conveyor of the type described which avoids the disadvantages and inflexibilities in construction and operation of the rollers previously employed; which can be adjusted in a simple and efficient manner to adapt the roller for use with material of different profiles, or different cross-sectional dimensions and shapes; which can be adjusted for use simultaneously to carry a number of products or pieces of work of different cross-section while maintaining a predetermined lateral spaced-apart relation during linear travel along a defined path without deviation sideways.

These and other objects and advantages of this invention will hereinafter appear and for purposes of illustration, but not of limitation, an embodiment of the invention is shown in the accompanying drawing, in which—

Figure 1 is a sectional elevational view taken axially along a supporting roller embodying the features of this invention;

Figure 2 is a sectional view taken substantially along the line 2—2 of Figure 1;

Figure 3 is a sectional view taken along the line 3—3 of Figure 1;

Figure 4 is a sectional view taken along the line 4—4 of Figure 1; and

Figure 5–10 illustrate several modifications of the combination of elements in a roller assembly embodying the features of this invention.

The roller conveyer of this invention is fabricated from a plurality of roller units each of which extend crosswise the path of the work in longitudinally spaced-apart relation. Each roller is substantially identical with the others and therefore description hereinafter will be made to one of the rollers for illustration of the inventive concepts.

Referring now to Figure 1 of the drawing, the roller is formed of an elongate shaft 1 mounted for free rotational movement in suitable journal bearings 2 supported on angle irons 4 to which the journals are secured, as by conventional means. The angle irons 4 are, in turn, arranged on a roller train 3 which operates as a housing for the driving members.

The shaft 1 is adapted to be driven in rotational movement by means of a sprocket wheel 5 keyed onto the end portion of the shaft to the left of the journal portion 6. A chain drive, indicated by the numeral 21, can be used to operate the sprocket wheel or use can be made of other means for driving the shaft, such as gear means, or a sheave can be mounted in place of the sprocket for use as a V-belt drive or the like.

The length of the shaft 1 between the journal ends 6 and 7, received in the journal bearings 2, is formed with a cross-section preferably of polygonal shape as illustrated by the shaft of hexagonal profile in the illustrated modification. Instead, the shaft may be triangular, square, octagonal or obular, or any cross-section other than round.

Mounted on the shaft are a plurality of roller discs 11 having a bore extending crosswise through the centers thereof corresponding in cross-section with that of the shaft to enable the disc members 11 to be shifted laterally on the shaft and to rotate with the shaft, thereby to permit lateral movement of the disc members to a desired position of adjustment while causing the disc members to rotate with the shaft in operation. The disc members are preferably formed in one piece, but they may be formed of two or more radial sections which are secured together into a unitary member by conventional fastening means such as by means of bolts, screws, adhesives or the like.

Each of the disc members 11 is formed with recesses 19 in both of the lateral end faces adjacent the bore to provide a groove adapted to receive spacing members 13 in fitting relation therein. For this purpose, it is preferred to make use of a circular recess, as illustrated in the drawing, but the recess can correspond in profile to that of the shaft 1 or the bore through which the shaft extends to provide a groove in the discs all about the shaft. The outer portions of the disc members are laterally beveled, as shown, so as to avoid lateral guidance to the roller profiles 14 or work, as illustrated in each of the figures. Instead of forming the disc members with beveled ends, the disc members may be formed round or with other desirable shapes.

Similarly, recesses are provided in the inner end of the set ring 8 having a set screw 9 operating through a threaded opening therein for holding the ring in a desired position on the shaft 1. A similar recess is also provided in the inner end of the displacement ring 16 mounted on the other end of the shaft 1 for locating the roller discs therebetween.

The spacers, indicated by the numerals 10, 13, and 15, represent cylindrical members having end portions formed with a cross-section corresponding to that of the recesses 19, and dimensioned to be received within the recesses of the disc members 11 in fitting relation thereby to enable the disc members and the end members 8 and 16 to hold the spacers together when, as in the preferred practice of this invention, the spacers are formed of two parts of semi-circular cross-section or of more parts in the form of small sectors. When in the assembled relation, the spacing members 10, 13 and 15 are formed to provide a bore corresponding to the profile of the shaft to enable lateral shifting movement thereon and the spacers are dimensioned to be of various lengths to provide a spaced relation between the disc members 11 for use with profiles of various shapes and cross-sections, as illustrated in Figures 5–10.

Some or all of the spacing members 13 can be replaced by guide disc members 12 of greater diameter than the disc members 11 so as to extend outwardly beyond the edges thereof when in the assembled relation to function as stop means for separating the roller crosswise into sections for transportation of work longitudinally therebetween without crosswise movement of the work in one section into the path of the work in another section, thereby to maintain a desired spaced relationship between the work pieces for greater access to the surfaces thereof in treatment without the danger of damage to the parts.

In order to permit flexibility in the arrangement of the guide discs 12 with respect to the disc members 11, the guide discs are formed similarly to the spacing members of two or more parts which fit together along radial surfaces to form an assembled disc, and which is formed to have shoulders 20 in both of the lateral end faces adjacent the bore corresponding in dimension and shape to the end sections of the spacing members 10, 13 and 15 so as to be received in fitting relation in the recesses 19 of the disc members 11 and the end members 8 and 16 whereby the guide discs are held together in the assembled relation on the roller.

The members 10, 11, 12, 13 and 15 are held in side-by-side interconnecting relation on the shaft between the displaceable ring 16 and the set ring 8 to form a composite roller. In assembly, the set ring 8 is pre-positioned on the shaft by means of the set screw 9. The displaceable ring 16 is held in position on the shaft 1 by clamping means, such as the key 17 operated in a wedge-shaped slot 18 of the shaft 1 to engage the outer wall of the displaceable member 16 for displacement thereof by camming action against the members 10, 11, 12, 13 and 15 whereby they are urged axially into engagement one with the other on the shaft with the end sections of the flange members received in the recesses 19 of the roller discs 11 and the end members 8 and 16.

The two or more part construction of spacing members 10, 13 and 15, and of the guide disc members 12, permits realignment of the members in various combinations without the necessity to dismount the shaft 1 from the roller train 3 or from the journal bearings 2.

Ordinarily, the number of roller discs on each shaft will be the same, depending upon the width of the roller train 3 or the width of the passage available through the processing machine, such as the blast machine for cleaning or treating the surfaces of the work advanced therethrough on the roller conveyor. In the illustrated modification, the shaft 1 is fitted with ten roller discs but the number and the size of the roller discs may be increased or decreased as desired.

In assembly, the roller discs are mounted onto the shaft 1 prior to mounting the shaft in the journal bearings 2. Thus the profile will be somewhat the same for all work pieces with the possibilities for variation residing in the spaced relationship between the disc members 11 as determined by the numbers and the lengths of the spacing members 13 and by the number of roller discs 11 between the guide disc member 12 used to subdivide the train into crosswise sections.

The various possible combinations, as represented by the assemblies illustrated in Figures 5–10, can be established by the proper selection and use of the spacing members 10, 13 and 15 and the guide disc members 12. Because of their multiple-part construction in sectors, the exchange of the spacing members and the guide disc members for various arrangements can be effected easily and efficiently by removing the clamping means holding the displaceable ring 16 on the shaft 1, as by removal of the key 17 in the illustrated modification. This enables the displaceable member 16 to be shifted to the left in Figure 1 and to free the other elements on the shaft for lateral displacement sufficiently to enable the shoulders or end sections of the elements 10, 12, 13 and 15 to be withdrawn from the recesses 19 of the disc members 11 and the end rings 8 or 16 so that the elements can be removed by separation of the parts for use in different locations or for replacement by other elements to form the various combinations illustrated upon relocation of the desired elements on the shaft. The relocated elements can be locked in position by axial displacement in the direction to seat the shoulder or end section in the recess 19 of the roller discs 11 or the end members 8 or 16, whereby the inserted unit is held together on the shaft.

Thus the guide discs 12 can be removed in their entirety, as in Figures 7–10, or else located in different positions, as illustrated in Figures 5 and 6. Similarly, the spacing members 13 can be removed in their entirety, as in Figure 7, or replaced by guide disc members, as in Figure 5, or reinserted in different positions, as in Figures 6 and 9, or else replaced by other spacing members of different lengths, as represented by the spacing members 22 in Figure 8 or the spacing members 23 in Figure 10, to provide a wider spaced relation between adjacent roller discs. It will be understood that the combinations available will be substantially unlimited and capable of meeting the needs for various pieces of work and materials of different profiles supported for advancement by the conveyor.

It will be apparent from the foregoing that numerous advantages have been made available by the described roller construction. The roller can be adapted easily and quickly to the shape of the work 14 to be carried. The rollers can be adjusted to enable passage of work of different shapes simultaneously through the machine thereby to make more efficient and more economical use of the conveyor. Modification by adjustment of elements from one combination or arrangement to another can be achieved in a simple and efficient manner without the necessity to dismount the roller shaft, thereby markedly to reduce the down time of the machine.

When the roller discs are formed of two or more part construction secured together by fastening means, the roller conveyor is further improved by the possibility of exchange of the roller members for wear, repair or the like, or to introduce rollers of different contours without the need of dismounting the shaft 1. To increase the service available from the elements, it is preferred that the elements 10, 11, 12, 13, 15, 22 and 23 be formed of wear-resistant material or else provided with wear-resistant surfaces, as by heat treatment, especially when the elements are employed in the portion of the conveyor subjected to the stresses and the abrasions of the particles which are thrown by the blast machine.

The use of a shaft other than round obviates the need for any special keying of the roller discs 11 to the shaft, thereby to eliminate the necessity to provide key slots and to fit keys to the slots.

The uniformity in shapes of the roller discs 11, the guide discs 12, and the spacing members 10, 13 and 15 tends to reduce the number and types of parts required to be available, thereby markedly to reduce the inventories which it is necessary to maintain for the machine.

It will be understood that changes may be made in the details of construction, arrangement and operation without departing from the spirit of the invention, especially as defined in the following claims.

I claim:

1. In a roller conveyor, a roller assembly comprising an elongate shaft having a cross-section other than round and mounted for rotational movement about a horizontal axis, a plurality of solid annular roller discs having a bore extending axially therethrough corresponding in cross-section to the cross-section of the shaft for enabling sliding movement of said discs axially on the shaft, said discs having annular grooves in the end faces adjacent the bore, segmental spacer members each of which is formed with a bore corresponding to the cross-section of the shaft to enable the spacer members to be received about the shaft in fitting relation and annular ribs extending outwardly axially from the end faces of the spacers about the bore dimensioned to be received in fitting relation with the grooves in the roller discs, said spacers being formed of at least two segmental parts separable along planes which extend longitudinally of the shaft and through the bore for assembly onto the shaft alongside the disc rollers, and means for holding the disc members and spacer members in fixed side by side relation on the shaft with the ribs of the spacer members seated within the grooves of the disc members for holding the spacer members in the assembled relation on the shaft.

2. A roller conveyor as claimed in claim 1 in which the shaft is of polygonal shape.

3. A roller conveyor as claimed in claim 1 in which the shaft is rectangular in cross-section.

4. A roller conveyor as claimed in claim 1 in which the roller discs are laterally chamfered.

5. A roller conveyor as claimed in claim 1 in which the spacer members include members of larger diameter than the disc members for use in subdividing the conveyor roller assembly laterally into sections.

6. A roller conveyor as claimed in claim 1 in which some of the spacer members are of smaller dimension than the roller discs to provide for a spaced relation therebetween.

7. A roller conveyor as claimed in claim 1 in which the spacer members are of two part construction wherein each part is substantially a semi-cylindrical section.

8. A roller conveyor as claimed in claim 1 which includes a spacer member at each end of the roller assembly and means for securing said end spacer members in fixed position axially on the shaft, said end spacer members having ribs only extending outwardly from the inner faces thereof.

9. A roller conveyor as claimed in claim 8 in which said end spacer members are of one piece construction mounted for sliding movement endwise on the shaft when said means fixing the units on the shaft is inactivated.

10. In a roller conveyor, a roller assembly comprising an elongate shaft mounted for rotation about its longitudinal axis, a plurality of solid annular roller discs mounted on said shaft, each of said discs having an axial bore therein slidably receiving said shaft, each of said discs having opposite end faces with annular grooves therein adjacent said bore, segmental spacer members mounted on said shaft between at least some of said discs, each of said spacer members having an axial bore therein slidably receiving said shaft, each of said members having opposite end faces with annular ribs extending outwardly therefrom in an axial direction adjacent said bore, said ribs being dimensioned to be received in fitting relation within said grooves in said roller discs, said spacer members being formed of at least two segmental parts separable along planes extending longitudinally of said shaft and through said bore, the engagement between said ribs and said grooves being effective to retain said spacer members on said shaft between said roller discs, and means for holding the assembly of said roller discs and spacer members against endwise movement on said shaft to prevent disengagement of said ribs from said grooves.

References Cited in the file of this patent
UNITED STATES PATENTS

| | | |
|---|---|---|
| 2,596,499 | Mercier | May 13, 1952 |
| 2,683,523 | Rottersmann | July 13, 1954 |